United States Patent
Nair et al.

(10) Patent No.: US 12,248,395 B2
(45) Date of Patent: Mar. 11, 2025

(54) DATA STORAGE DEVICE AND METHOD FOR PREDICTABLE LOW-LATENCY IN A TIME-SENSITIVE ENVIRONMENT

(71) Applicant: Western Digital Technologies, Inc., San Jose, CA (US)

(72) Inventors: Devika Nair, Bangalore (IN); Amit Sharma, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/226,385

(22) Filed: Jul. 26, 2023

(65) Prior Publication Data

US 2024/0411678 A1  Dec. 12, 2024

Related U.S. Application Data

(60) Provisional application No. 63/471,411, filed on Jun. 6, 2023.

(51) Int. Cl.
  *G06F 12/00* (2006.01)
  *G06F 11/08* (2006.01)
  *G06F 12/02* (2006.01)

(52) U.S. Cl.
  CPC .......... *G06F 12/0215* (2013.01); *G06F 11/08* (2013.01); *G06F 2212/1024* (2013.01)

(58) Field of Classification Search
  CPC ............. G06F 12/0215; G06F 22/08; G06F 2212/1024; G06F 11/08
  See application file for complete search history.

(56) References Cited

U.S. PATENT DOCUMENTS

| | | | |
|---|---|---|---|
| 8,006,068 B1* | 8/2011 | Steiner | G06F 9/3877 712/34 |
| 8,959,417 B2 | 2/2015 | Zhu et al. | |
| 9,208,018 B1 | 12/2015 | Northcott et al. | |
| 9,317,435 B1* | 4/2016 | Bairavasundaram | G06F 12/0868 |
| 10,749,809 B2 | 8/2020 | Ho et al. | |
| 11,074,011 B2 | 7/2021 | Muthiah | |
| 11,397,638 B2 | 7/2022 | Hornung et al. | |
| 2003/0016596 A1* | 1/2003 | Chiquoine | G06F 11/1076 369/34.01 |
| 2008/0275928 A1 | 11/2008 | Shuster | |
| 2009/0276686 A1 | 11/2009 | Liu et al. | |

(Continued)

OTHER PUBLICATIONS

U.S. Appl. No. 17/567,099, filed Dec. 31, 2021, entitled "Low Latency Parit for a Memory Device."

(Continued)

*Primary Examiner* — Craig S Goldschmidt
(74) *Attorney, Agent, or Firm* — Crowell & Moring LLP

(57) ABSTRACT

A data storage device and method are provided for predictable low-latency in a time-sensitive environment. In one embodiment, a data storage device is provided comprising a memory and a controller configured to communicate with the memory. The controller is further configured to: receive, from a host, an indication of a logical block address range that the host will later read; and in response to receiving the indication: read data from the logical block address range; and perform an action on the data to reduce a read latency when the host later reads the logical block address range. Other embodiments are disclosed.

15 Claims, 8 Drawing Sheets

(56) References Cited

U.S. PATENT DOCUMENTS

| | | | |
|---|---|---|---|
| 2010/0017556 A1* | 1/2010 | Chin | G06F 12/0246 |
| | | | 711/E12.001 |
| 2014/0082261 A1 | 3/2014 | Cohen et al. | |
| 2017/0008522 A1* | 1/2017 | Sato | B60W 60/0051 |
| 2019/0202065 A1* | 7/2019 | Hayashi | A63H 11/00 |
| 2019/0243908 A1 | 8/2019 | Lee et al. | |
| 2020/0301841 A1 | 9/2020 | Caraccio et al. | |
| 2022/0253379 A1* | 8/2022 | Hu | G06F 3/0659 |

OTHER PUBLICATIONS

Battaglia, E. et al.; Rethinking Autonomous Surgery: Focusing on Enhancement over Autonomy; downloaded from the Internet on Jan. 25, 2023 at *Rethinking Autonomous Surgery: Focusing on Enhancement over Autonomy—ScienceDirect*; Science Direct; European Urology Focus, vol. 7, Issue 4; Jul. 2021; 23 pages.

"Low Latency Solution for Autonomous Drones"; Automation News & Resources Case Studies; downloaded from the Internet on Jul. 25, 2023 at *Low Latency Solution for Autonomous Drones | Euresys Case Studies* (automate.org); Association for Advancing Automation; Sep. 5, 2017; 9 pages.

\* cited by examiner

DATA STORAGE DEVICE AND METHOD FOR PREDICTABLE LOW-LATENCY IN A TIME-SENSITIVE ENVIRONMENT

CROSS-REFERENCE TO RELATED APPLICATION

This application claims priority to U.S. provisional patent application No. 63/471,411, filed Jun. 6, 2023, which is hereby incorporated by reference.

BACKGROUND

A host can retrieve data from and/or store data in a data storage device. Some hosts may require data be retrieved from the data storage device in a certain amount of time. For example, advancements in autonomous vehicles (e.g., autonomous cars) and robotics can demand real-time (or near real-time), low-latency data processing. In such environments, it may be expected that the data storage device will provide the data to the host (e.g., surgical robot) in a predictable and time-sensitive (e.g., time-critical) manner.

DETAILED DESCRIPTION

Figure 1A:
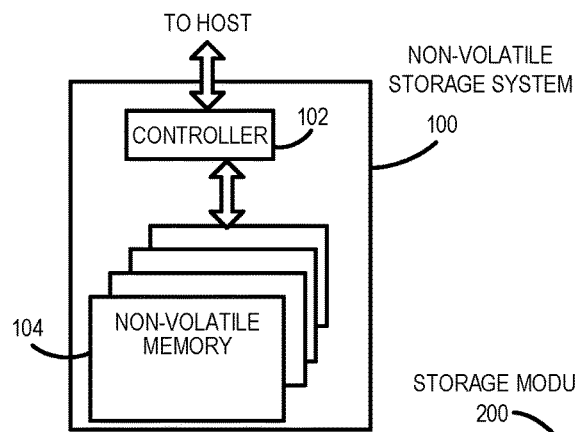
FIG. 1A is a block diagram of a data storage device of an embodiment.

The following embodiments generally relate to a data storage device and method for predictable low-latency in a time-sensitive environment. In one embodiment, a data storage device is provided comprising a memory and a controller configured to communicate with the memory. The controller is further configured to: receive, from a host, an indication of a logical block address range that the host will later read; and in response to receiving the indication: read data from the logical block address range; and perform an action on the data to reduce a read latency when the host later reads the logical block address range.

In some embodiments, the controller is further configured to determine whether the read latency is above a threshold when reading the data from the logical block address range; and the action is performed in response to the read latency being above the threshold.

In some embodiments, the controller is further configured to, after the action is performed, confirm that the read latency is not above the threshold.

In some embodiments, the controller is further configured to inform the host in response to the read latency still being above the threshold after the action is performed.

In some embodiments, the threshold is provided by the host.

In some embodiments, the action comprises performing an error correction operation on the data.

In some embodiments, the action comprises moving the data to a different block in the memory.

In some embodiments, the action comprises moving the data from a multi-level cell (MLC) block to a single-level cell (SLC) block.

In some embodiments, the action comprises moving the data to an area of the memory reserved for time-sensitive data.

In some embodiments, the host comprises an automated vehicle.

In some embodiments, the host comprises a surgical robot.

In some embodiments, the memory comprises a three-dimensional memory.

In another embodiment, a method is provided that is performed in a data storage device comprising a memory. The method comprises: receiving, from a host, an indication of a logical block address range that the host will later read; in response to receiving the indication: reading original data from the logical block address range, wherein the original data is stored in the memory with a set of parity bits; and storing a copy of the data in the memory with fewer, if any, parity bits than what is stored with the original data; and in response to receiving a command from the host to read the logical block address range, reading the copy of the data instead of the original data, wherein because the copy of the data is stored with fewer, if any, parity bits than what is stored with the original data, reading the copy of the data instead of the original data reduces read latency.

In some embodiments, the data is time-sensitive data.

In some embodiments, the copy of the data is stored in a single-level cell (SLC) memory.

In some embodiments, the copy of the data is stored in an area of the memory reserved for time-sensitive data.

In some embodiments, the host comprises an automated vehicle.

In some embodiments, the host comprises a surgical robot.

In some embodiments, the memory comprises a three-dimensional memory.

In another embodiment, a data storage device is provided comprising: a memory; means for receiving, from a host, an indication of an area of the memory that the host will later read; and means for, in response to receiving the indication: reading data from the area of the memory; and performing an action on the data to reduce a read latency when the host later reads the area of the memory.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
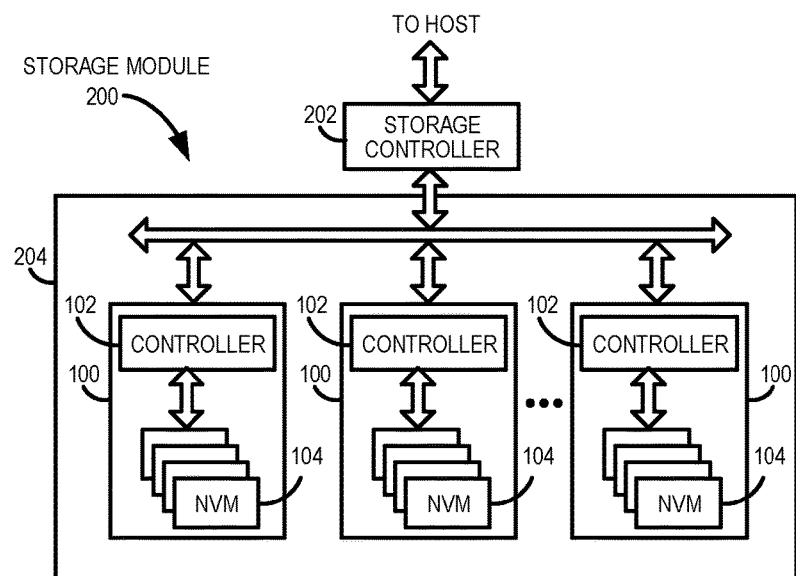
FIG. 1B is a block diagram illustrating a storage module of an embodiment.
Figure 1C:
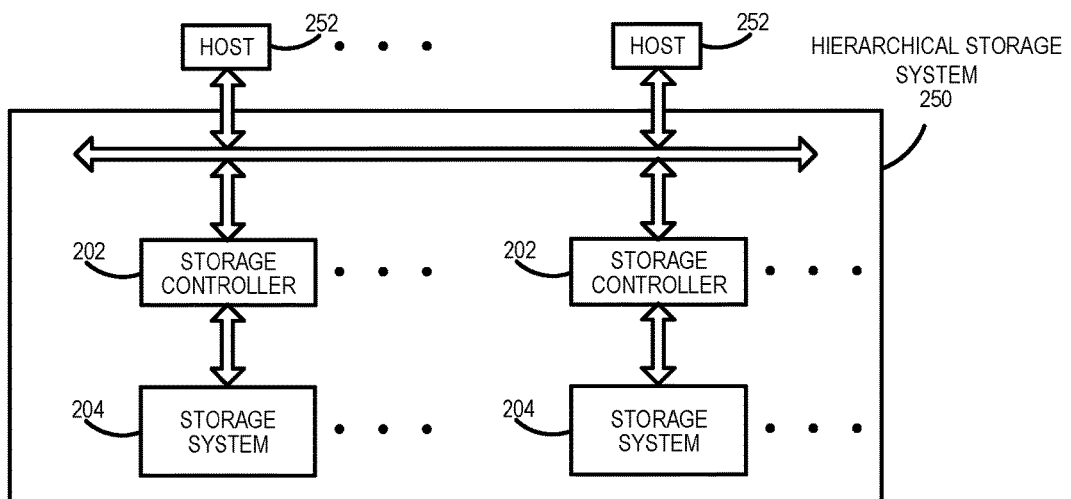
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
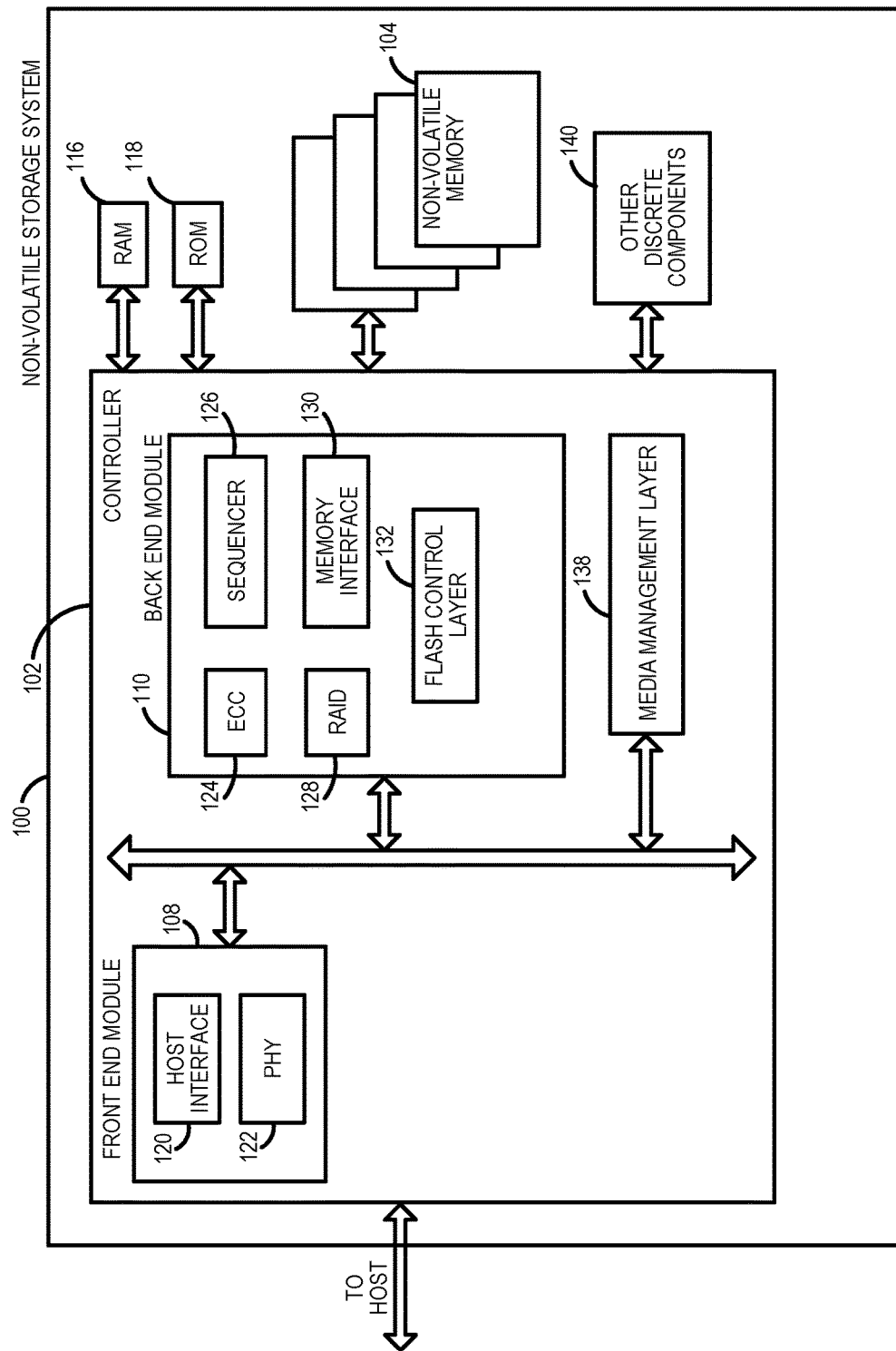
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a selfcontained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
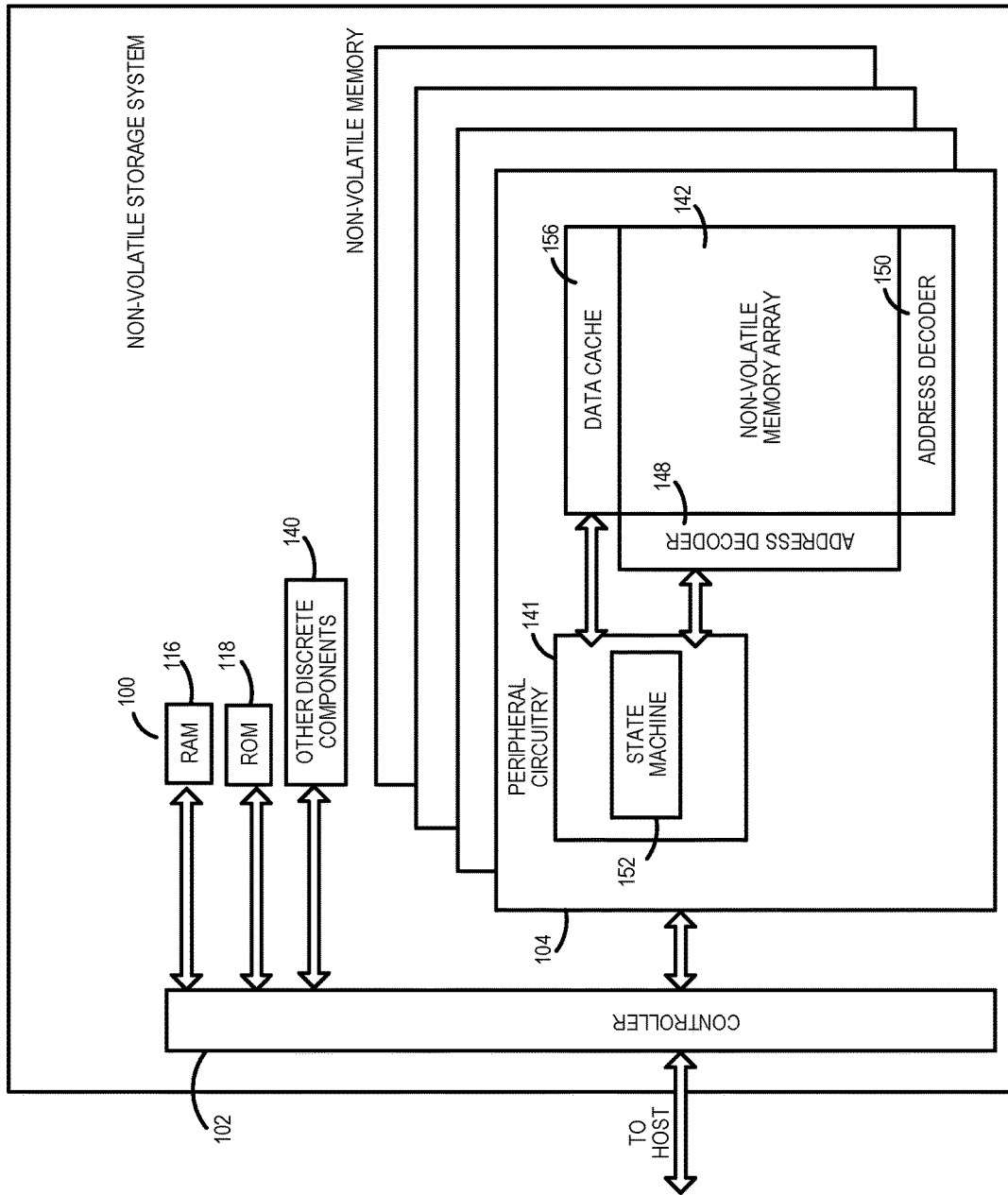
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
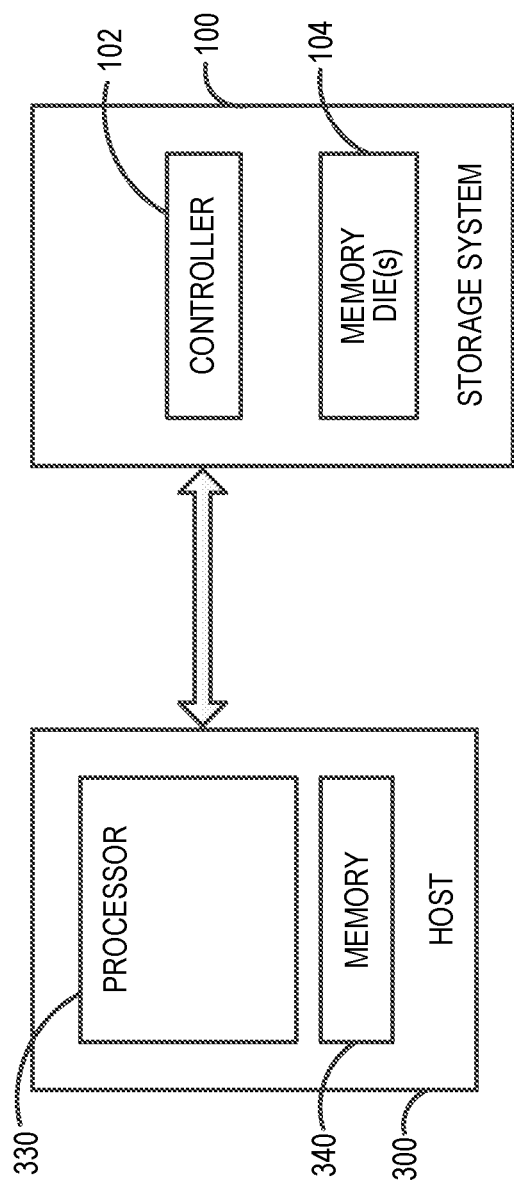
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, an autonomous vehicle, a medical robot etc. The host 300 in this embodiment (here, a computing device) comprises a processor 330 and a memory 340. In one embodiment, computer-readable program code stored in the host memory 340 configures the host processor 330 (which can be one or more processors) to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, advancements in autonomous vehicles and robotics can demand real-time (or near real-time), low-latency data processing. In such environments, it may be expected that the data storage device will provide the data to the host (e.g., car, surgical robot) in a predictable and time-sensitive (e.g., time-critical) manner.

For example, automated robots are being explored in a variety of fields, where the robot would perform any operation autonomously. One such example is the surgical robotic systems that can classify autonomy for medical robots on a scale from 0 to 5, with 0 corresponding to no autonomy, with the surgeon remaining in full control, and 5 to a system fully capable of performing entire surgeries with no human input.

As can be seen from these examples, some environments may require that images/data be read from the data storage device in real-time (or near real-time) without delay. Any latencies induced by the data storage device may be critical for the proper functioning of the system. However, a memory (e.g., NAND storage media) of a data storage device can encounter errors due to several reasons. Data storage devices can often correct these errors by various built-in error-correction mechanisms, such as low-density parity check (LDPC) and exclusive-or (XOR) operations, but these correction schemes can induce some latencies and unpredictability in the response of the data storage device. These latencies can be critical for the environments mentioned above. In some situations, even a few microseconds/milliseconds of delay in reading the data from the data storage device can be of the utmost importance and impact basic functionality of the system.

The following embodiments can be used to avoid these data storage device latencies. In one embodiment, before reading data from the data storage device 100, the host 300 indicates to the data storage device 100 the highly time-critical logical block address (LBA) range, and the controller 102 in the data storage device 100 takes action to ensure that the host-indicated time-critical LBA range can be read in a fast and a predictable manner.

More specifically, these embodiments can be used to ensure that the error correction mechanism of the data storage device 100 does not get invoked while reading time-critical data. As mentioned above, it is common to have errors in the memory 104 for several reasons, and the data storage device 100 can have a correction mechanism to correct those errors. However, those correction mechanisms take time to correct the data, which can add unpredictability to the device response time, which can be critical in some situations. So, in one embodiment, error correction is not performed when reading time-critical data. For example, before reading the actual data, the host 300 can indicate to the data storage device 100 that it is going to later require a given LBA range to be read in a time-sensitive manner. On this hint, the controller 102 of the data storage device 100 can scan the LBA range in the memory 104 and respond back to the host 300 with either an acknowledgment or a message that the data storage device 100 may potentially induce time delays with the data is eventually read. The affirmative result of this interaction can be valid for a timeframe, and the host 300 may need to re-trigger this mechanism before repeating time-sensitive operations.

In one example implementation, before performing a time-sensitive operation, the host 300 (e.g., a robot/self-operating device) can initiate a communication with the data storage device 100 asking whether or not given data can later be read in a predictable, time-sensitive manner. During such communication, the host 300 can also provide the data storage device with a time frame for preparing the data. The host-device communication can be achieved in multiple ways, and one such way is illustrated in FIG. 4.

Figure 4:
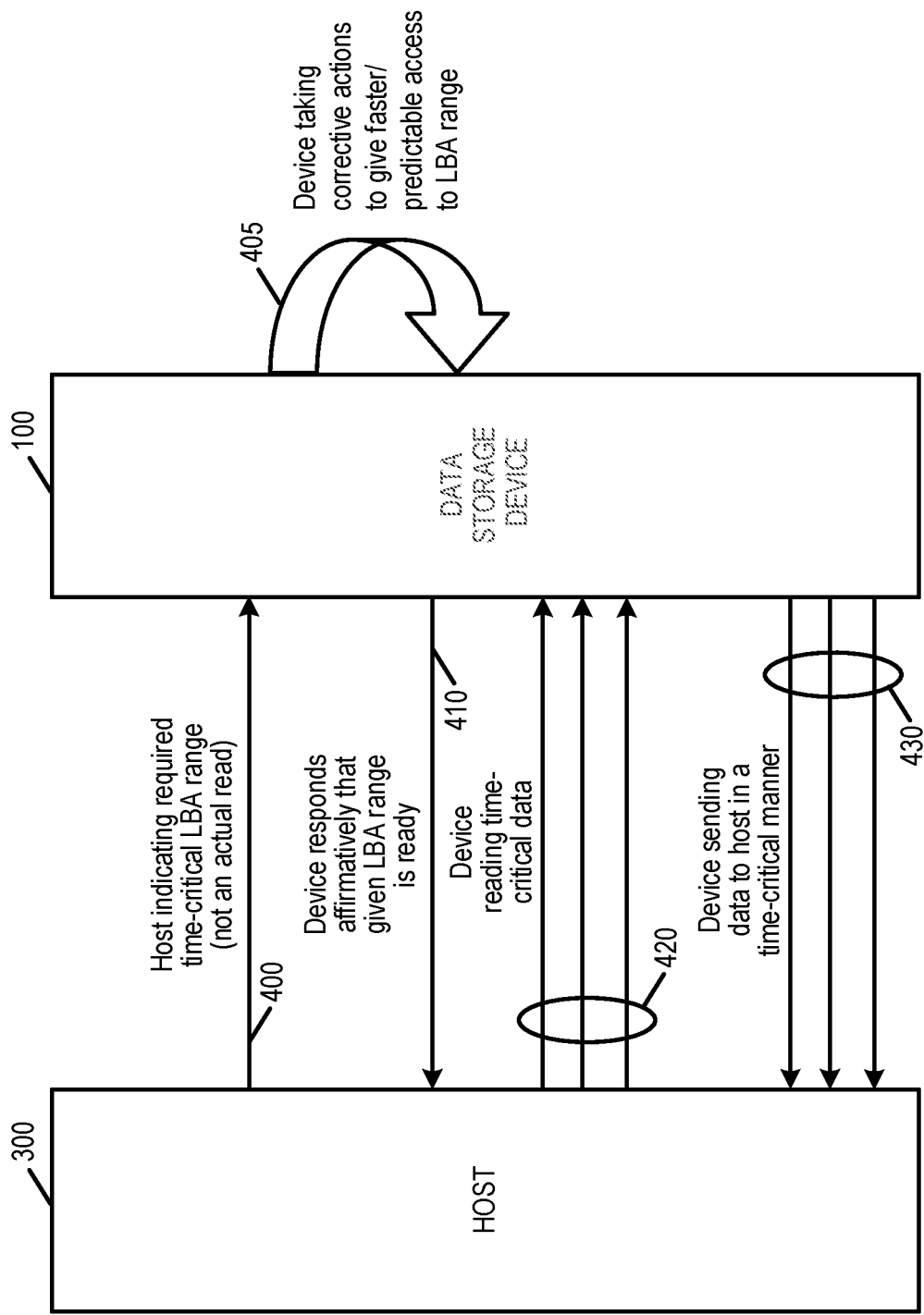
FIG. 4 is an illustration of communications between a host and a data storage device of an embodiment for time-sensitive data reads.

As shown in FIG. 4, the host 300 (e.g., a robot/self-operating device) identifies time-sensitive data that it may read in the future and provides the data storage device 100 with an indication of the LBA range for that data (act 400). This indication is not an actual read command for the data, as the actual read command will come later. In response, the controller 102 of the data storage device 100 can scan through the LBA range and make sure that the LBA range will not induce any delays due to memory errors. This can involve the controller 102 taking corrective action on the data stored in the LBA range to give faster/predictable access to the LBA range when the host 300 eventually reads the data (act 405). For example, the controller 102 can perform error correction, which can be achieved through moving data to a different block. After attempting such data movement, the indicated LBA range can be scanned to ensure the new location is able to provide data with faster/predictable manner.

The controller 102 then responds to the host 300 that the LBA range is ready to be read (act 410). Next, the host 300 sends read command(s) to the data storage device 100 to read the data (act 420), and the controller 102 in the data storage device 100 responds by returning the data (act 430). Again, because the data in the LBA has already been error corrected, the data can be read from the data storage device 100 in a relatively-fast and predictable manner without unpredictable delays.

Figure 5:
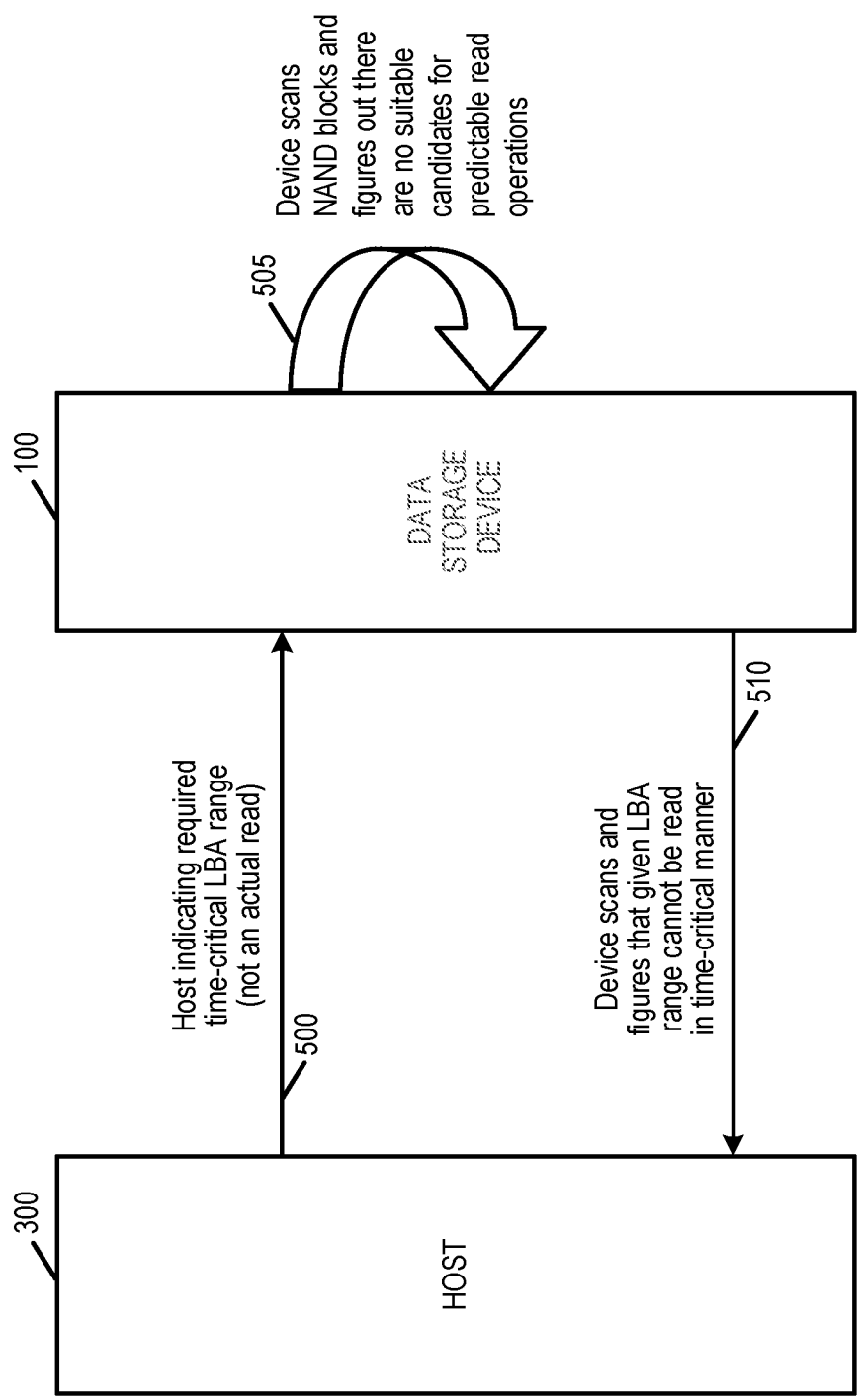
FIG. 5 is an illustration of communications between a host and a data storage device of an embodiment where the data storage device cannot provide a time-sensitive data read.

As illustrated in FIG. 5, there may be situations where the memory 104 is so worn out (e.g., due to a high number of program/erase cycles of the memory 104) that the data storage device 100 cannot satisfy the host's request. So, after receiving the host's indication (act 500) and performing the memory scan and attempting data movement to a different block (act 505), if the new data location also exhibits higher BER, the data storage device 100 can respond back negatively to the host 300 indicating that reading the given LBA range could have some unpredictable delays (act 510). In this situation, the error correction can be done at run-time during the operation of the read command, which can induce delays. The host 300 can then decide either to continue or to replace the data storage device 100. The host 300 can repeat the above procedures before performing any time-sensitive operation.

As mentioned above, the controller 102 of the data storage device 100 can perform a bit error rate (BER) scan on the indicated LBA range of the memory 104. If the BER is above a threshold, the controller 102 can trigger an error-correction mechanism, which would induce delays. In one embodiment, the controller 102 is provided with one or both of the following mechanisms-one to ensure memory errors are not encountered and the other to reduce the amount of data to be toggled out of the memory 104.

Starting first with the mechanism to reduce errors, errors get induced in the memory 104 over time or with repetitive memory operations. During the error-detection phase, the controller 102 can identify the BER of time-sensitive data and use the error-correction mechanism to correct the errors. Depending on the error severity (e.g., if the BER is above a certain threshold), certain correction mechanisms (e.g., LDPC operations with longer decode times, BER estimation scan (BES) operations, soft-bit reads, etc.) may be required. The additional time to correct such errors could range from tens of microseconds to milliseconds. So, it may be desired to reduce the BER below the threshold, so such time-consuming error-correction mechanisms may not need to be used.

Figure 6:
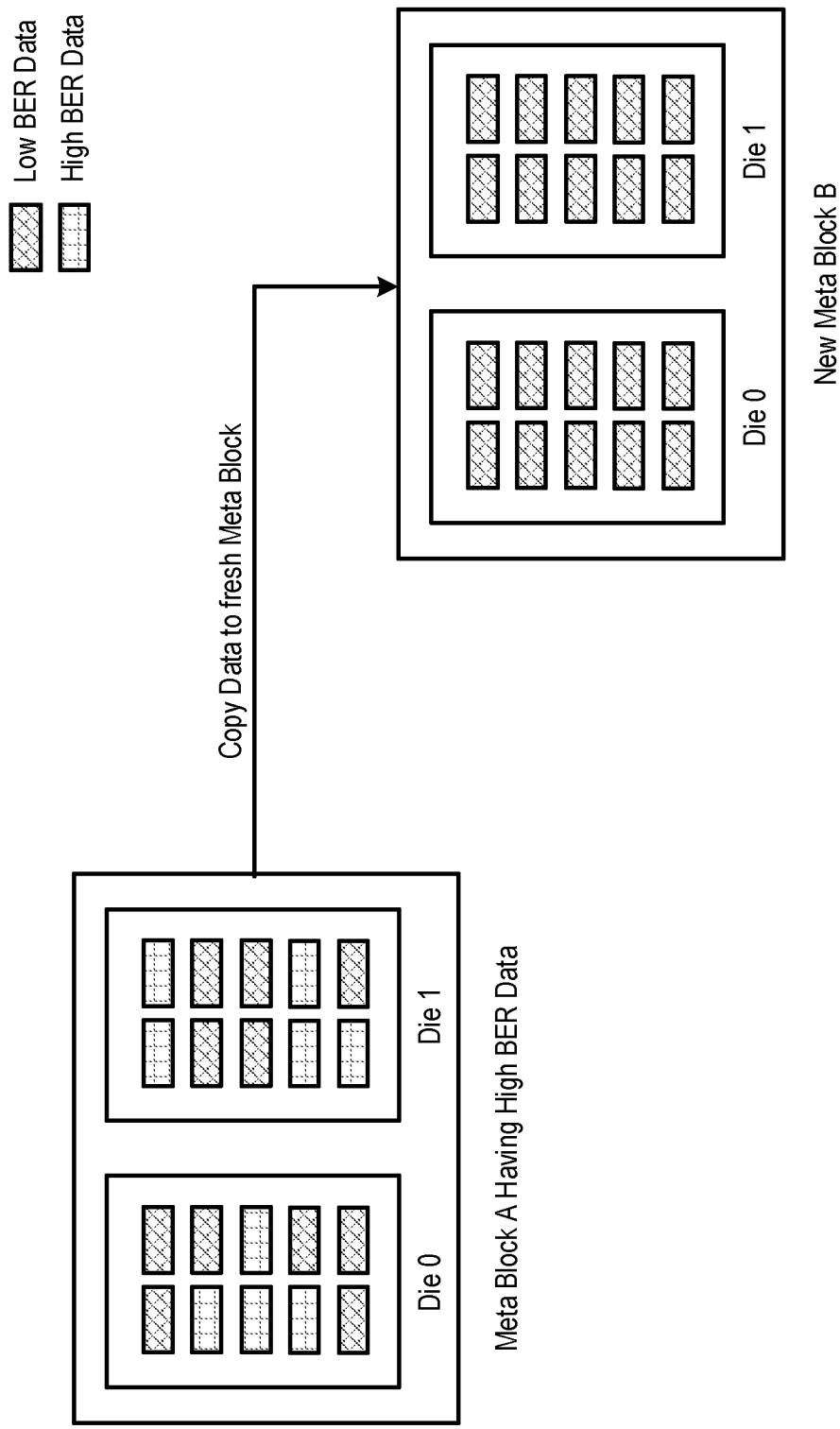
FIG. 6 is an illustration of a method of an embodiment where data is moved from a block having a high bit-error rate (BER) to a block having a low BER rate.

To reduce the BER, the controller 102 can move data to a new block (the new block probably does not have the same error-causing issues as the original block) (see FIG. 6), move the data from multi-level cell (MLC) blocks to single-level cell (SLC) blocks (which typically have fewer error-causing issues), and/or ensure that certain healthy memory blocks are reserved for time-sensitive data. After refreshing/moving the data, the controller 102 can check the BER of the data to ensure it is under the threshold. If the BER is still above the threshold (or not low enough under the threshold), the controller 102 can repeat the above process.

Figure 7:
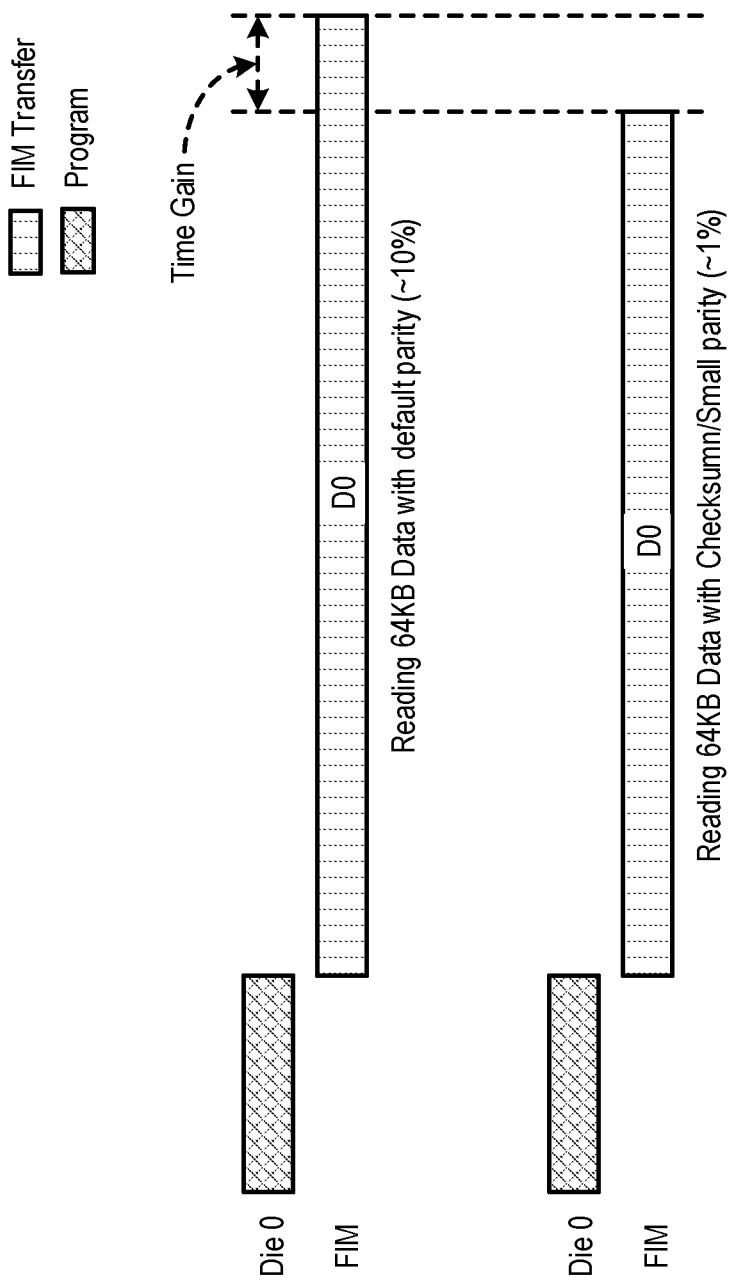
FIG. 7 is an illustration of a method of an embodiment for improving performance of a direct memory access (DMA) operation.

Turning now to the method to reduce data-transfer time, for smaller read operations in low queue-depth scenarios, direct memory access (DMA) operations can come into the foreground. In one embodiment, the controller 102 can improve or optimize the performance of these operations by reducing the amount of data to be toggled out through DMA operations. This is illustrated in FIG. 7. As shown in FIG. 7, error correction code (ECC) parity size can range up to 10% of the total data written. While reading data, this parity can be toggled out alongside host data, and an ECC engine can operate on this parity to find and correct the errors. In one embodiment, the host 300 passes the LBA range for which it wants to reduce the DMA transfer overheads (e.g., the highest read latency critical data), and the controller 102 of the data storage device 100 reduces the parity size for the LBA range (e.g., by reducing the parity to a minimal checksum or by reducing LDPC parity). This LBA range can be stored into the healthiest block of the memory 105 as a faster copy, with the original (full parity) version retained in the memory 104. When the host 300 later reads the LBA range, the controller 102 can use a data structure that associates a physical address of the copy of the data with the LBA range, so that the copy of the data is returned instead of the original data. This can reduce read latency.

There are several alternatives that can be used with these embodiments. For example, in response to receiving a signal in advance from the host 300 of the LBA range that will be read, the controller 102 of the data storage device 100 can mark the LBA range for a speculative read to reduce future latency. Also, in another alternative, elements of the NVMe protocol can be used. For example, the dataset management context attributes feature can be used to mark an LBA range for an upcoming read and request low latency on that read. Also, the get LBA status (rebuild assist) feature can be used to mark LBA ranges in order to check for potential errors.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a non-volatile memory array;
a data cache; and
a processor configured to communicate with the memory and further configured to:
receive, from a host, an indication of a logical block address range that the host will later read;
in response to receiving the indication:
read original data from the non-volatile memory array, wherein the original data is stored in the non-volatile memory array with a set of parity bits; and
store a copy of the data in the non-volatile memory array with fewer, if any, parity bits than what is stored with the original data in the non-volatile memory array;
receive a command from the host to read the logical block; and
in response to receiving the command from the host to read the logical block address range, read, from the non-volatile memory array, the copy of the data instead of the original data, wherein because the copy of the data is stored in the non-volatile memory array with fewer, if any, parity bits than what is stored in the non-volatile memory array with the original data, reading the copy of the data from the non-volatile memory array instead of reading the original data from the non-volatile memory array reduces read latency because fewer parity bits are read from the non-volatile memory array.

2. The data storage device of claim 1, wherein the data is time-sensitive data.

3. The data storage device of claim 1, wherein the copy of the data is stored in a single-level cell (SLC) memory in the non-volatile memory array.

4. The data storage device of claim 1, wherein the copy of the data is stored in an area of the non-volatile memory array reserved for time-sensitive data.

5. The data storage device of claim 1, wherein the host comprises an automated vehicle.

6. The data storage device of claim 1, wherein the host comprises a robot.

7. The data storage device of claim 1, wherein the memory comprises a three-dimensional memory.

8. A method comprising:
performing in a data storage device comprising a non-volatile memory array and a data cache:
receiving, from a host, an indication of a logical block address range that the host will later read;
in response to receiving the indication:
reading original data from the non-volatile memory array, wherein the original data is stored in the non-volatile memory array with a set of parity bits; and
storing a copy of the data in the non-volatile memory array with fewer, if any, parity bits than what is stored with the original data in the non-volatile memory array;
receiving a command from the host to read the logical block; and
in response to receiving the command from the host to read the logical block address range, reading, from the non-volatile memory array, the copy of the data instead of the original data, wherein because the copy of the data is stored in the non-volatile memory array with fewer, if any, parity bits than what is stored in the non-volatile memory array with the original data, reading the copy of the data from the non-volatile memory array instead of reading the original data from the non-volatile memory array reduces read latency because fewer parity bits are read from the non-volatile memory array.

9. The method of claim 8, wherein the data is time-sensitive data.

10. The method of claim 8, wherein the copy of the data is stored in a single-level cell (SLC) memory in the non-volatile memory array.

11. The method of claim 8, wherein the copy of the data is stored in an area of the non-volatile memory array reserved for time-sensitive data.

12. The method of claim 8, wherein the host comprises an automated vehicle.

13. The method of claim 8, wherein the host comprises a robot.

14. The method of claim 8, wherein the non-volatile memory array comprises a three-dimensional memory.

15. A data storage device comprising:
a non-volatile memory array;
a data cache; and
means for:
receiving, from a host, an indication of a logical block address range that the host will later read;
in response to receiving the indication:
reading original data from the non-volatile memory array, wherein the original data is stored in the non-volatile memory array with a set of parity bits; and storing a copy of the data in the non-volatile memory array with fewer, if any, parity bits than what is stored with the original data in the non-volatile memory array;

receiving a command from the host to read the logical block; and in response to receiving the command from the host to read the logical block address range, reading, from the non-volatile memory array, the copy of the data instead of the original data, wherein because the copy of the data is stored in the non-volatile memory array with fewer, if any, parity bits than what is stored in the non-volatile memory array with the original data, reading the copy of the data from the non-volatile memory array instead of reading the original data from the non-volatile memory array reduces read latency because fewer parity bits are read from the non-volatile memory array.

* * * * *